US010846287B2

(12) United States Patent
Sagade et al.

(10) Patent No.: US 10,846,287 B2
(45) Date of Patent: Nov. 24, 2020

(54) SYSTEMS AND METHODS FOR USE IN VALIDATING DATA IN CONNECTION WITH DATA QUERIES

(71) Applicant: MASTERCARD INTERNATIONAL INCORPORATED, Purchase, NY (US)

(72) Inventors: Chinmay Sharad Sagade, Chesterfield, MO (US); Sanchit Kaushik, Pune (IN); Srinivas Kosaraju, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 227 days.

(21) Appl. No.: 15/850,877

(22) Filed: Dec. 21, 2017

(65) Prior Publication Data

US 2019/0197157 A1    Jun. 27, 2019

(51) Int. Cl.
*G06F 16/245*    (2019.01)
*G06F 16/25*    (2019.01)

(52) U.S. Cl.
CPC .......... *G06F 16/245* (2019.01); *G06F 16/254* (2019.01)

(58) Field of Classification Search
CPC ..................................................... G06F 16/245
See application file for complete search history.

(56) References Cited

U.S. PATENT DOCUMENTS

| 6,434,549 B1 * | 8/2002 | Linetsky | G06F 16/95 707/719 |
| 2017/0300404 A1 * | 10/2017 | Thanabalan | G06F 16/334 |
| 2018/0082237 A1 * | 3/2018 | Nagel | G06F 21/6254 |

* cited by examiner

*Primary Examiner* — Dawaune A Conyers
(74) *Attorney, Agent, or Firm* — Harness, Dickey & Pierce, P.L.C.

(57) ABSTRACT

Systems and methods are provided for loading data in connection with testing an application, based on a hierarchical framework. An exemplary method includes receiving a data query from a requestor, identifying a dependency of the data query on a data structure, and determining whether said data structure is annotated with a poor quality indicator. The exemplary method further includes providing a warning to the requestor when the data structure is annotated with the poor quality indicator, thereby informing the requestor of a potential quality issuer with a report relying on the data structure query.

15 Claims, 3 Drawing Sheets

US 10,846,287 B2

SYSTEMS AND METHODS FOR USE IN VALIDATING DATA IN CONNECTION WITH DATA QUERIES

FIELD

The present disclosure generally relates to systems and methods for use in validating data in connection with data queries, and in particular, to determining when data queries are dependent on poor quality data and to warning requestors associated with the data queries about the dependencies.

BACKGROUND

This section provides background information related to the present disclosure which is not necessarily prior art.

Data is known to be loaded into data structures and utilized for a variety of different operations. In particular, the data is often subject to data queries, which pull the data from the data structures for use in the operations. Data queries may be used, for example, to generate reports, which, in turn, are disseminated to third parties, whereby the third parties rely on the reports to makes business decisions, or other decisions. When errors exist in the underlying data, the reports, which incorporate the errors, are flawed and, thereafter, any reliance on the reports may be incorrect and/or improper. As such, data quality tools are known to determine when the quality of data in a warehouse is poor, based on errors encountered in populating the data warehouse. In connection therewith, users may become knowledgeable about the quality analysis of data prior to submitting data queries for the data.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Reports are often compiled based on data associated with companies, customers, entities, or others, etc., so that the companies, customers, entities, or others are provided accurate insight and/or can make informed decisions (e.g., business decisions, etc.) based thereon. The source of the data may include, for example, data warehouses, into which the data is loaded via one or more process. Quality of the data in the warehouses may be altered by errors in the loading process or in the raw data itself which is to be loaded. When errors exist in the data, and are not identified by users compiling the reports, the reports, which rely on the data, may be misrepresentative, false, and potentially misleading.

Uniquely, the systems and methods herein provide a query analyzer, which provides warnings to requestors of such data (and/or related reports) from a data warehouse, when the queries (and/or related reports) are dependent on poor quality data. In particular, the query analyzer receives a data query, for example, from a requestor for a report and/or for the underlying data on which the report is to be based. The query analyzer in turn determines (or identifies) each of the data structures (and potentially, subparts of the data structure(s)) upon which the query is dependent. Then, the query analyzer determines, based on a data quality check, whether a poor quality indicator has been annotated to the data structure(s) (or potentially, the subparts of the data structure(s)), and when such indicator has been annotated, provides a warning to the requestor indicating the potentially poor quality data. In this manner, the requestor is informed, directly, of the quality of the data underlying the query and serving as the basis for any report. The warning may include details of the underlying "poor quality" data structure(s), so that the requestor may be able to determine the impact and/or effect of the poor quality data, prior to relying on and/or delivering the related report to a third party (or not). Additionally, or alternatively, the data query by the requestor may be halted based on the warning, thereby inhibiting generation of the related report and, as a result, any delivery of an errant report to a third party. As such, through the systems and methods herein, the data quality of data structures (e.g., tables, etc.) in data warehouses may be linked to corresponding data queries, making warnings and/or providing for the halt of the data queries unavoidable (and generally commonplace) when the dependent data structures (and/or the data included therein) are of poor quality.

Figure 1:
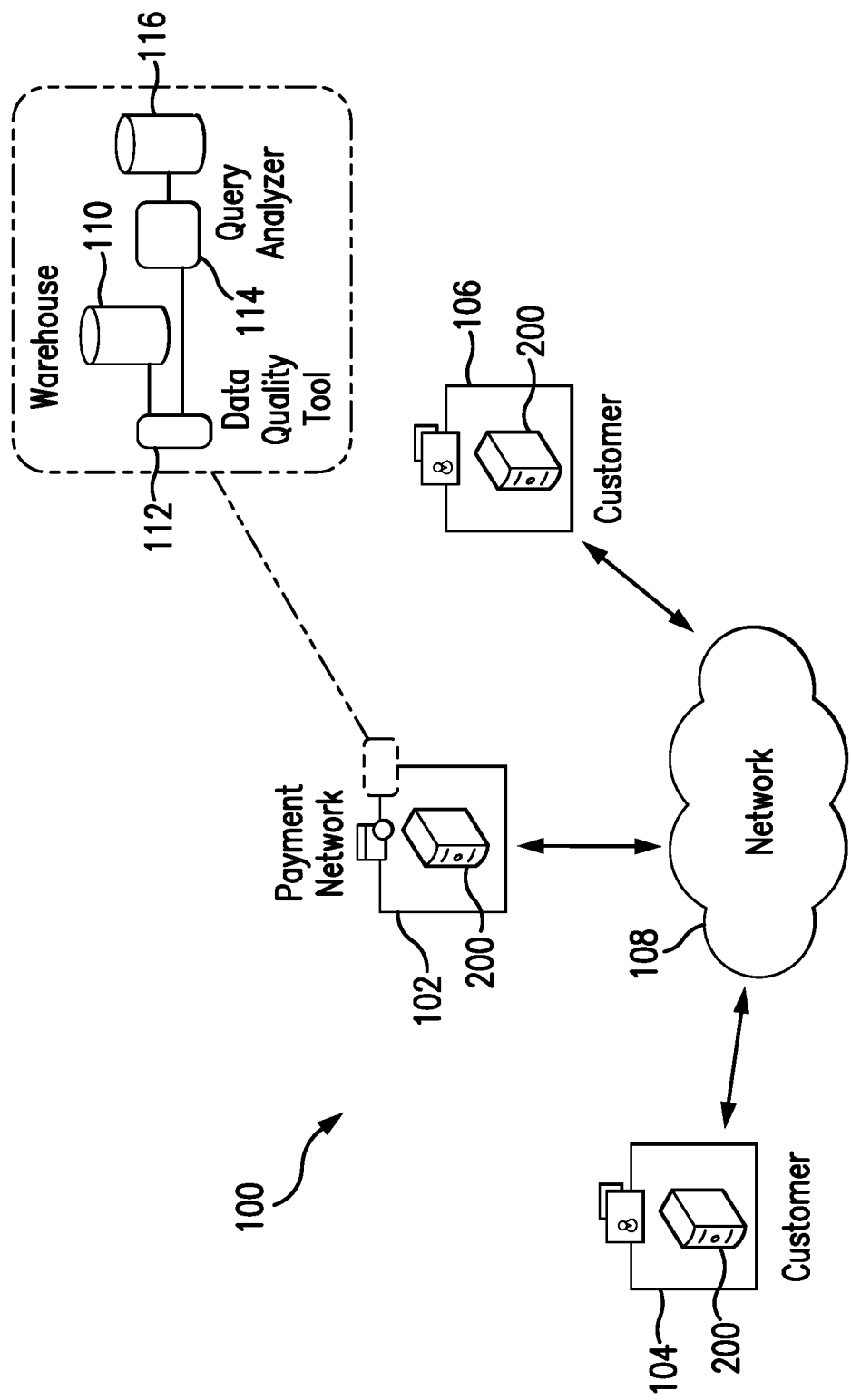
FIG. 1 illustrates an exemplary system for validating data in connection with data queries, and including one or more aspects of the present disclosure.

FIG. 1 illustrates an exemplary system 100, in which one or more aspects of the present disclosure may be implemented. Although parts of the system 100 are presented in one arrangement, other embodiments may include the same or different parts arranged otherwise, depending, for example, on applications and/or services involved therein, data warehouses available for access, etc.

The illustrated system 100 generally includes a payment network 102 and customers 104 and 106, each coupled to network 108. The network 108 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, the network 108 includes multiple networks, where different ones of the multiple networks are accessible to different ones of the illustrated components in FIG. 1. In particular, the payment network 102 and the customer 104 may be connected via a private network for processing transactions, and separately the payment network 102 may be connected to the customer 106 through a public network, such as the Internet.

Generally in the system 100, the customers 104 and 106 are financial institutions, such as banks, which provide financial services related to banking, lending, insurance, investment, etc. The customers 104 and 106 may therefore rely on certain data from the payment network 102 to make business decisions or other decisions related to those financial services. With that said, while the customers 104 and 106 are described as financial institutions herein, it should be appreciated that the customer may include any type of entity, institution, person, etc., which may request and/or rely on data from the payment network 102 (or another entity). What's more, while described as implemented in the payment network 102, the present disclosure should not be understood to be limited to the payment network 102, or to payment networks in general, as other entities may be included in other system embodiments. In general, the present disclosure is applicable to entities that maintain a data warehouse and provide reports from the data warehouse, either internally or externally, to customers thereof or other interested entities.

As shown in FIG. 1, the payment network 102 of the illustrated system 100 generally includes, as indicated by the dotted lines, a data warehouse 110, a data quality tool 112, and a query analyzer 114.

The data warehouse 110 of the payment network 102 includes numerous data structures, which contain data related to the payment network 102. The data structures may include, for example, transaction data such as authorization records, debit records, clearing records, settlement records, collections only records, etc. In general, the warehouse 110 includes multiple, dozens, hundreds, thousands, or more of such data structures containing data related to the payment network 102 and/or to entities with which the payment network 102 interacts. The data structures may be segregated from one another based on subject matter, data topic, date, time, business association, region, etc. For example, the warehouse 110 may include a separate data structure for clearing data, per interval (e.g., daily, etc.), whereby each interval of data is stored within the warehouse 110 in a separate data structure. The data structures of the warehouse 110 may also include a variety of forms, including, specifically, for example, tables. In connection therewith, the data structures may then further include subparts of data, such as, for example, columns or rows of data within the tables.

Data may be loaded to and/or stored in the data structures of the data warehouse 110 by any suitable source(s) of such data. For example, a banking institution may provide clearing data to the payment network 102, which is loaded to the data warehouse 110. Or, a point-of-sale (POS) terminal at a merchant may provide authorization data to the payment network 102, which in turn is loaded to the data warehouse 110. Regardless, in connection with loading such data, the warehouse 110 may experience one or more errors, for example, where the data loads fail, or where incorrect or unexpected characters in the data result in corrupted data in the warehouse 110, or where incorrect or errant transformation processes load the data to the warehouse 110, etc. As a result, the data, and specifically, the data structures within the warehouse 110, may be of poor quality. In this exemplary embodiment, for this reason, the system 100 (and particularly the payment network 102) includes the data quality tool 112, which is coupled to the warehouse 110 and is configured to identify poor quality data structures and/or or subparts of the data structures, and to annotate the data structures and/or the subparts thereof with a poor quality indicator, as necessary, to identify such potential errors (and data associated therewith). As data is received by the data warehouse 110, the data quality tool 112 employs conventional technique to determine whether or not to annotate the specific data structures and/or their subparts of the data structures based on the data received and/or included therein. For example, the data quality tool 112 may provide data quality inspection structure query language (SQL) queries, which then make use of statistical measures to identify possible data corruption, errors, etc. as the data is received to and/or stored at the data warehouse 110 (or subsequent thereto), etc.

In connection with the data warehouse 110, the payment network 102 permits one or more data queries to be submitted, by a requestor, to the warehouse 110, whereupon data is delivered to the requestor. Specifically, for example, a user (not shown) associated with the payment network 102 may be required to send weekly reports to the customer 104 related to regional clearing records. The user may then submit a data query (e.g., a SQL query, etc.) to the warehouse 110, which attempts to retrieve all data for clearing in a specific region within a defined interval. It should be understood that the query, because it is directed to a region (or for other reasons) (or not), may rely on multiple different data structures within the warehouse 110 and/or on only specific subparts of the multiple different data structures.

In the exemplary embodiment, the system 100 (and particularly the payment network 102) includes the query analyzer 114, which is configured, by executable instructions, to operate as described herein, for example, in response to data queries submitted to the data warehouse 110, etc. The query analyzer 114 is coupled to and is in communication with the warehouse 110 and the data quality tool 112. The query analyzer 114 is further coupled to and/or in communication with a database 116. That said, while the database 116 is illustrated as separate in FIG. 1, it should be appreciated that the database 116 may be integrated, in some embodiments, in whole or in part, with the query analyzer 114 and/or the warehouse 110, or otherwise.

In operation, when a user (e.g., a user associated with the payment network 102, etc.) (broadly, a requestor) submits a data query to the data warehouse 110, the query analyzer 114 is configured to receive the data query and to identify dependencies in the data query. Specifically, the query analyzer 114 is configured to determine which of the data structures and/or subparts thereof, in the data warehouse 110, upon which the data query is dependent. Once identified, the query analyzer 114 is configured to interact with the data quality tool 112 and to determine whether the dependent data structures are annotated, by the data quality tool 112, with a poor quality indicator. If such indicator is not present, the query analyzer 114 is configured to submit the data query to the warehouse 110 and, subsequently, to return the data resulting from the query back to the user. However, when one or more of the dependent data structures is annotated with a poor quality indicator, the query analyzer 114 is configured to provide a warning to the user and to record the warning to the database 116. In turn, the query analyzer 114 may be configured to then halt the data query (based on the presence of the poor quality indicator in one or more of the dependent data structures), so that the user may determine the impact of the annotation on any subsequent reports and/or reformulate the data query (as desired). Or, the query analyzer 114 may be configured to submit the data query to the warehouse 110 anyway, even though one or more of the dependent data structures is annotated with the poor quality indicator, thereby relying on the user, in view of the warning, to resolve any issues with the resulting data and/or the reports reliant thereon.

An exemplar script (script.py), written in the python programming language, is shown below as an example of how user interaction with the system 100 may be facilitated, where "queryTask" represents the user's data query to the data warehouse 110:

```
                            script.py from __future__ import absolute_import
from lungi.tasks.QueryTask import QueryTask
from lungi.tasks.PM import PM
query_task = QueryTask("queryTask");
query_task.setSQL("select brand_franchisor_id from
core.product_hierarchy limit 1");
``` providing a written warning to the user when one or more of the dependent data structures is annotated with a poor quality indicator, where the checkAlertsDB function invokes a JAVA-based SQL parser, which returns a list of table dependencies in the data query. Once the list is retrieved, the checkAlertsDB function checks if any poor quality indicators exist in a database. The checkAlertsDB function prints a written advisory if any poor quality indicators are found.

```
                         QueryTask.py from lungi.tasks.Task import Task
from lungi.utils.DQAlertsUtils import DQAlertsUtils
from py4j.java_gateway import JavaGateway
class QueryTask(Task):
    def __init__(self, name):
        self.task_name = "genericAuditTask"
        self.task_script_materialized = ""
        self.task_output_dir = ""
        self.task_extn = "sql"
        self.properties = { }
        self.p_handle = None
        self.logFile = ""
        self.str_cmd = ""
        self.continue_on_error = False
        super( ).__init__(name,".sql")
    def getMRParams(self):
        params = [ ]
        for name, value in self.properties.items( ):
            params.append("-hiveconf " + name + "=" + value)
        return ' '.join(map(str, params))
    def getBeelineCmd(self):
        return ("beeline -u "
                 "org.apache.hive.jdbc.HiveDriver\"")
    def checkAlertsDB(self,queryFile):
        gateway = JavaGateway( )
        content="";
        with open(queryFile, "r") as content_file:
            content = content_file.read( )
        parser = gateway.jvm.com.mastercard.eds.sql.parser.ParserImpl( )
        dependencies = parser.getDependentTableNames(content)
        self.alerts_db_handle = DQAlertsUtils( )
        for table in dependencies:
            hasAlert,incidenceNbrs=self.alerts_db_handle.checkAlert("HADOOP",table)
            if hasAlert:
                print("WARNING: THE TABLE "+ table +" REFERENCED IN
"+self.task_name+" QUERY HAS ACTIVE DQ ALERTS!")
                print("DQ INCIDENCE NUMBERS:"+str(incidenceNbrs))
    def run(self):
        self.setEngineProperties( )
        # Call the function to check for DQ issues.
        self.checkAlertsDB(self.task_script_materialized);
        self.logFile = self.task_script_materialized + ".log"
        self.str_cmd =   "nohup " + self.getBeelineCmd( ) \
                        +" "    + self.getMRParams( ) \
                        +" -f " + self.task_script_materialized \
                        +" 2>&1>" + self.logFile
        return super(QueryTask, self).run( );
```

-continued

```
                            script.py taskList=[query_task];
pm = PM(taskList,None);
out=pm.start( );
```

Exemplar code for the QueryTask class (consistent with query analyzer 114), instantiated by the exemplar script above and also written in the python programming language, is shown below for receiving the user's data query (e.g., "Task," below) to the data warehouse 110, executing the data query, and (1) identifying dependent data structures (e.g., tables) in the data query, (2) determining whether the data structures are annotated with a poor quality indicator, and (3)

While only one payment network 102 and two customers 104 and 106 are illustrated in the system 100 in FIG. 1 (for ease of reference), it should be appreciated that the system 100, and/or other system embodiments of the present disclosure, may include multiple ones of one or more of these parts in various combinations (as well as one or more additional parts).

Figure 2:
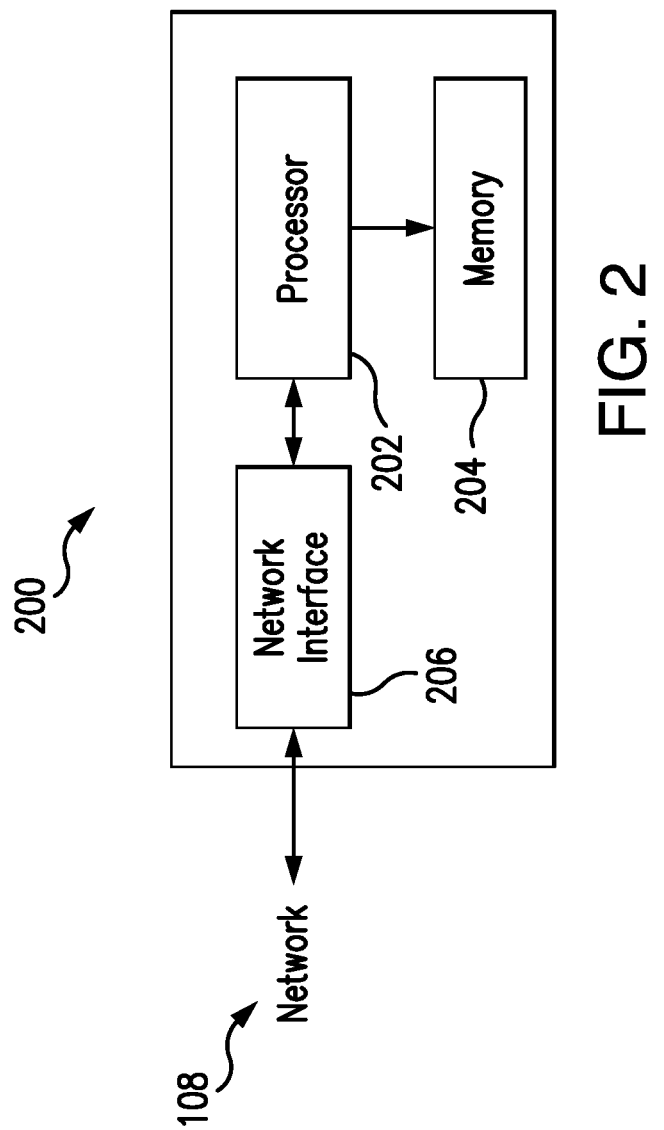
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the exemplary embodiment of FIG. 1, each of the payment network 102 and the banking institutions 104 and 106 are illustrated as including, or being implemented in, computing device 200, coupled to the network 108. In addition, each of the data quality tool 112 and the query analyzer 114 may be considered a computing device, or may be considered implemented in a computing device, consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read-only memory (ROM), erasable programmable read-only memory (EPROM), solid state devices, flash drives, CD-ROMs, thumb drives, floppy disks, tapes, hard disks, and/or any other type of volatile or nonvolatile physical or tangible computer-readable media. The memory 204 may also include one or more data structures (e.g., as associated with the data warehouse 110, the data structure 116, etc.), and may further be configured to store, without limitation, warnings, data queries, dependency information, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

In addition, the illustrated computing device 200 includes a network interface 206 coupled to the processor 202 and the memory 204. The network interface 206 may include, without limitation, a wired network adapter, a wireless network adapter, a mobile network adapter, or other device capable of communicating to one or more different networks, including the network 108. Further, in some exemplary embodiments, the computing device 200 includes the processor 202 and one or more network interfaces incorporated into or with the processor 202.

Figure 3:
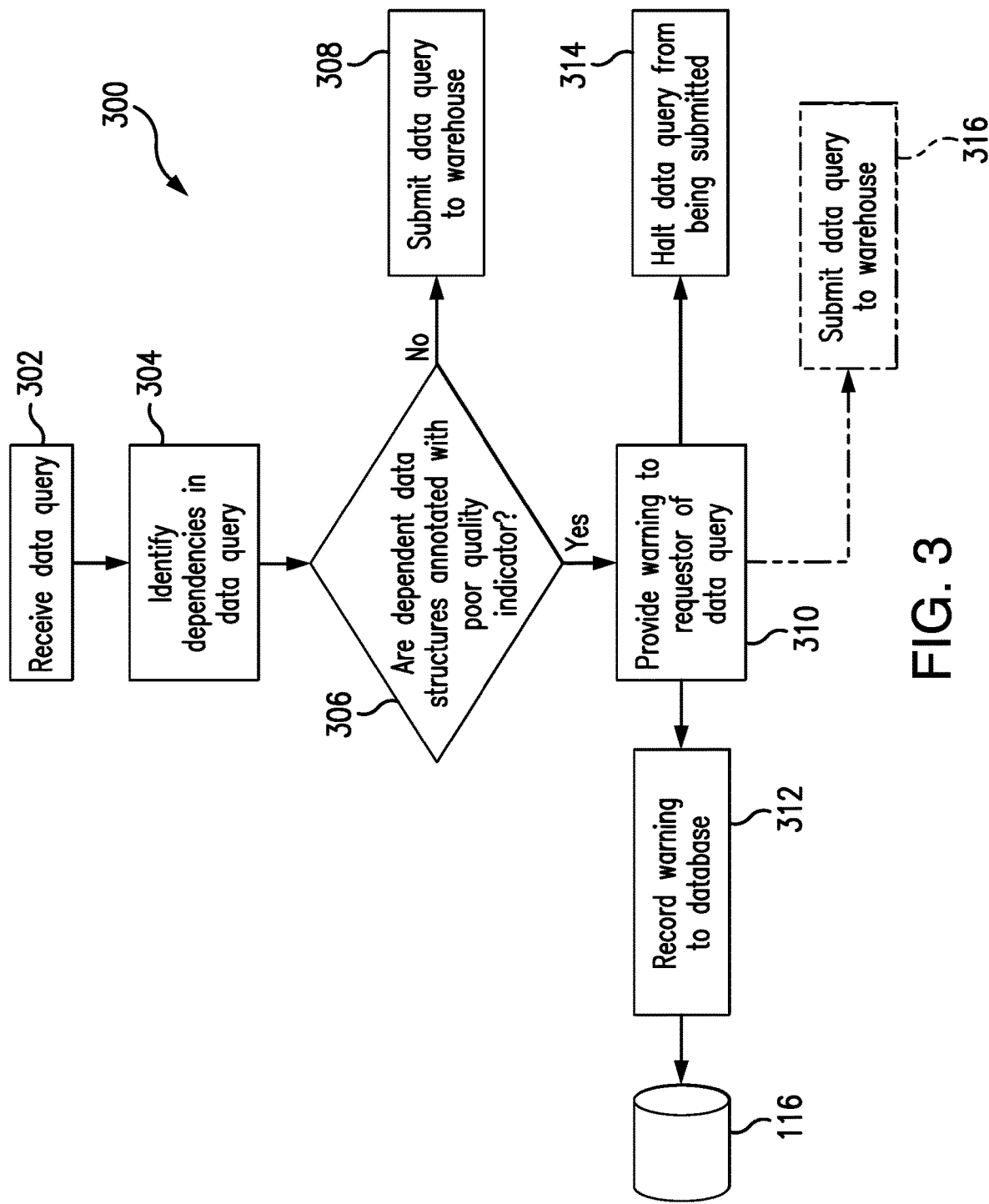
FIG. 3 is an exemplary method of validating data in connection with data queries to data structures, based on quality indicators associated with the data structures, and which can be implemented via the system of FIG. 1.

FIG. 3 illustrates an exemplary method 300 for validating data in connection with data queries to data structures associated with such data. The exemplary method 300 is described (with reference to FIG. 1) as implemented in the query analyzer 114, the warehouse 110, and the data quality tool 112 of the payment network 102 (in the system 100), and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

Initially in the method 300, an example data query is submitted by a user (associated with the payment network 102) (broadly, a requestor) to the data warehouse 110, in connection with a report to be generated for the customer 106. For example, an analyst user associated with the payment network 102 may request particular data from the data warehouse 110 relating to multiple banking institutions, for use in generating a performance benchmark report for a particular one of the banking institutions. Regardless, in this example, the data query is dependent on three different data structures (i.e., DS1 (e.g., a clearing data structure, etc.), DS2 (e.g., a debit data structure, etc.), and DS3 (e.g., an authorization data structure, etc.)), and in particular, the entire first and second data structures DS1 and DS2, and a subpart of the third data structure DS3. In addition, each of the data structures DS1, DS2, and DS3 in this example includes a table associated with the requested data, and the subpart of the third data structure DS3 includes two columns (i.e., the third and fifth columns) associated with the requested data.

In turn, the data query is received by the query analyzer 114, at 302. Thereafter, the query analyzer 114 identifies the dependencies included in the data query, at 304. For example, the query analyzer 114 may rely on SQL grammar to locate particular table names from the query, and included in the data warehouse 110; etc. Specifically in this example, and as generally described above, the query analyzer 114 identifies each of the three data structures DS1, DS2, and DS3 of the data warehouse 110 as containing data relating to the query (and to be included in the report for the customer 106). The data structures are identified by name as DS1, DS2, and DS3. In addition, the query analyzer 114 may further (optionally) identify, at 304, any subparts of the data structures DS1, DS2, and DS3 upon which the data query is dependent. In this example, and as indicated above, the query analyzer 114 identifies the third and fifth columns of the third data structure DS3 as including data relating to the query (e.g., columns "transaction amount" and "Merchant ID," etc.).

Once the dependencies are identified from the data query, the query analyzer 114 next determines, at 306, whether any of the identified data structures DS1, DS2, and DS3 are annotated with a poor quality indicator. Specifically, the query analyzer 114 interacts with the data quality tool 112, which as described above has previously analyzed each of the data structures and/or the data contained in each of the data structures included in the data warehouse 110 to determine a quality of the corresponding data. If, for example, the data included in the data structure DS1 was corrupt when the data was loaded to the data warehouse 110, with incorrect and/or unexpected characters, or was only partially included in the data structure DS1 through a partial or failed data load, etc., the data may be determined to be of poor quality by the data quality tool 112. In turn, the data quality tool 112 would annotate the data structure DS1 containing the data, or more particularly the subset of the data structure DS1 containing the data, with a poor quality indicator. In general, the data quality tool 112 generally annotates the data structure DS1, as a whole, with the poor quality indicator, regardless of the particular location of the poor quality data within the data structure DS1. However, in some embodiments, it is contemplated that the data quality tool 112 may annotate, with the poor quality indicator, the particular subpart of the data structure DS1 in which the poor quality data is actually stored (e.g., the eighth column of a table therein, etc.).

With continued reference to FIG. 3, if the query analyzer 114 determines that a poor quality indicator is not annotated to any of the identified data structures DS1, DS2, and DS3, the query analyzer 114 concludes and submits, at 308, the data query to the data warehouse 110 for execution.

However, if the query analyzer 114 determines, at 306, that at least one of the data structures DS1, DS2, and DS3 upon which the data query depends is annotated with a poor quality indicator, the query analyzer 114 provides, at 310, a warning to the user. The warning may include, without limitation, a name of the data query, a listing of each of the dependent data structures DS1, DS2, and DS3, an identification of the data structures DS1, DS2, and DS3 annotated with the poor quality indicator, and potentially (if available) an identification of the particular subset of each of the data structures DS1, DS2, and DS3 annotated with the poor quality indicator (e.g., the eighth column of a table in data structure DS1, etc.). In addition, the query analyzer 114 records, at 312, the warning, or part thereof, to the database 116. As such, the warning may subsequently be used as a record that the user was in fact notified of the potential problem with the data associated with his/her query.

Further, the query analyzer 114, in connection with providing the warning to the user (when one or more of the data structures DS1, DS2, and DS3 are identified as being annotated with a poor quality indicator), also halts, at 314, the data query from being submitted to the warehouse 110, so that the potentially bad data is not returned to the user and is not used to generate (or compile) the report (and so that an inaccurate report is not sent to a third party without first addressing the poor quality data). Alternatively, however, as indicated by the dotted lines in FIG. 3, the query analyzer 114 may still submit, at 316, the data query to the warehouse 110, even when the warning is provided (e.g., as standard procedure, unless the data query is interrupted by the user, etc.). This may avoid delays in the data warehouse 110 receiving the query and the user receive the data, despite the warning, but may be subject to the user manually halting and/or deleting the data query or reviewing the data prior to use in generating the related report.

In view of the above, the systems and methods herein provide a framework for users to submit queries to data warehouses, in which warnings are provided, by a query analyzer, when the queries are dependent on poor quality data. In this manner, the users are immediately notified, even before the queries are executed, of quality issues with the data in the warehouse that is the subject to the data queries. The query analyzer may further halt the data queries, until the data quality is addressed, or permit the data queries to proceed, with the users being warned that the data to be returned includes poor quality data. Moreover, the query analyzer may include in the warnings to the users the names and/or identifiers for the data structures (or subparts thereof) annotated as being of poor quality, whereby the users may separately judge the impact of the poor quality data and modify any related reports making use of the data, as appropriate, and/or halt generation of the reports until the data is remedied/addressed. Accordingly, based on the above, the users are provided with indicators of the quality of data to be used in their reports prior to generating the reports, and are also provided with flexibility in addressing data identified as potentially being of poor quality. In so doing, reports containing poor quality data may be inhibited from being provided to third parties.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a computing device, a data query from a requestor; (b) identifying, by the computing device, a dependency of the data query on a data structure; (c) determining, by the computing device, whether said data structure is annotated with a poor quality indicator; and (d) providing, by the computing device, a warning to the requestor when the data structure is annotated with the poor quality indicator, thereby informing the requestor of a potential quality issuer with a report relying on the data structure query.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in providing a warning for poor quality data in connection with a data query for such data from a requestor, the method comprising:
   receiving, by a query analyzer computing device, the data query from the requestor;
   parsing, by the query analyzer computing device, the received data query to identify a table dependency of the data query on a table stored in a data structure included in a data warehouse;
   determining, by the query analyzer computing device, whether said data structure is annotated with a poor quality indicator, the data structure annotated with the poor quality indicator based on identification of an error or data corruption by a data quality tool for data received to and/or stored at the data warehouse; and
   in response to the data structure being annotated with the poor quality indicator:
      halting, by the query analyzer computing device, the data query from being submitted to the data warehouse; and
      providing, by the query analyzer computing device, a warning to the requestor thereby informing the requestor of a potential quality issue with a report relying on the data query.

2. The computer-implemented method of claim 1, further comprising submitting the data query to the data warehouse when the data structure associated with the identified table dependency is not annotated with the poor quality indicator.

3. The computer-implemented method of claim 1, wherein the table dependency includes a dependency on a subpart of the data structure.

4. The computer-implemented method of claim 3, wherein the subpart of the data structure includes a column of the table.

5. The computer-implemented method of claim 4, wherein the warning includes a name of the data structure, a name of the table, and a name of the column annotated with the poor quality indicator.

6. The computer-implemented method of claim 1, further comprising halting the data query from being submitted to the data warehouse when the data structure associated with the identified table dependency is annotated with the poor quality indicator.

7. The computer-implemented method of claim 1, wherein the data query includes a structure query language (SQL) data query; and
   wherein identifying the table dependency of the data query includes identifying the table dependency of the data query based on SQL grammar of the data query.

8. A non-transitory computer-readable storage media including executable instructions for providing warnings for data queries dependent on poor quality data, which, when executed by at least one processor, cause the at least one processor to:
   parse a received data query to identify a table dependency of the data query on a table stored in a data structure;
   determine whether the data structure including the table, upon which the data query is dependent, is annotated with a poor quality indicator, wherein the data structure is annotated with the poor quality indicator based on identification of an error or data corruption by a data quality tool for data received to and/or stored at the data structure;
   notify a requestor of the data query, when the data structure is annotated with the poor quality indicator; and
   halt said data query from submission to a data warehouse associated with the data structure, based on said data structure being annotated with the poor quality indicator.

9. The non-transitory computer-readable storage media of claim 8, wherein the executable instructions, when executed by the at least one processor, further cause the at least one processor to submit the data query to the data warehouse when the data structure associated with the identified table dependency is not annotated with the poor quality indicator.

10. The non-transitory computer-readable storage media of claim 8, wherein the executable instructions, when executed by the at least one processor, further cause the at least one processor to halt the data query from being submitting to the data warehouse when the data structure associated with the identified table dependency is annotated with the poor quality indicator.

11. The non-transitory computer-readable storage media of claim 8, wherein the executable instructions, when executed by the at least one processor, cause the at least one processor, in order to notify the requestor, to provide a warning to the requestor, wherein the warning includes a name of the data structure annotated with the poor quality indicator.

12. A system for use in providing a warning for poor quality data in connection with a data query for such data from a requestor, the system comprising:
   a data warehouse including multiple data structures, each of the multiple data structures including transaction data associated with at least one financial institution; and a query analyzer computing device coupled to the data warehouse and configured to:

receive the data query from the requestor directed to the data warehouse;

parse the received data query to identify each table dependency of the data query on at least one of the multiple data structures included in the data warehouse;

provide a warning to the requestor when one or more of the at least one of the multiple data structures is annotated with a poor quality indicator, thereby informing the requestor of a potential quality issue with relying on the data query, wherein the one or more of the at least one of the multiple data structures is annotated with the poor quality indicator based on identification of an error or data corruption by a data quality tool for data received to and/or stored at the data warehouse; and halt the data query from submission to the data warehouse based on the one or more of the at least one of the multiple data structures being annotated with the poor quality indicator.

13. The system of claim 12, wherein the query analyzer computing device is further configured to halt the data query from being submitting to the data warehouse when the one or more of the at least one of the multiple data structures is annotated with the poor quality indicator.

14. The system of claim 12, wherein the query analyzer computing device is further configured to submit the data query to the data warehouse, even when the one or more of the at least one of the multiple data structures is annotated with the poor quality indicator, unless the data query is interrupted by the requestor.

15. The system of claim 12, wherein the query analyzer computing device is further configured to record the warning in a database associated with the query analyzer computing device, when the warning is provided to the requestor.

\* \* \* \* \*